US006626024B1

(12) United States Patent
Hedrick

(10) Patent No.: US 6,626,024 B1
(45) Date of Patent: Sep. 30, 2003

(54) REDUNDANT ALTIMETER SYSTEM WITH SELF-GENERATING DYNAMIC CORRECTION CURVE

(76) Inventor: Geoffrey S. M. Hedrick, 14 Laurel Cir., Malvern, PA (US) 19355-2912

( * ) Notice: Subject to any disclaimer, the term of this patent is extended or adjusted under 35 U.S.C. 154(b) by 0 days.

(21) Appl. No.: 09/798,229

(22) Filed: Mar. 2, 2001

(51) Int. Cl.[7] .................. G01C 17/38; G01C 25/00; G01C 7/40; G12B 13/00
(52) U.S. Cl. .................. 73/1.78; 73/179; 73/178 R
(58) Field of Search .................. 73/179, 865.2, 73/178 R, 1.78, 181, 182, 384–387; 701/4; 342/120

(56) References Cited

U.S. PATENT DOCUMENTS

| | | | |
|---|---|---|---|
| 4,507,962 A | 4/1985 | Hitt et al. ............ | 73/384 |
| 5,349,347 A | * 9/1994 | Muller ............... | 340/969 |
| 5,661,649 A | * 8/1997 | Carson et al. ........ | 364/420 |
| 5,692,062 A | 11/1997 | Lareau et al. ........ | 382/107 |
| 5,774,826 A | 6/1998 | McBride ............. | 701/207 |
| 5,986,604 A | 11/1999 | Nichols et al. ....... | 342/357.12 |
| 6,088,634 A | 7/2000 | Muller et al. ........ | 701/9 |
| 6,092,009 A | 7/2000 | Glover .............. | 701/14 |
| 6,216,064 B1 | * 4/2001 | Johnson et al. ....... | 701/4 |
| 6,266,583 B1 | * 7/2001 | Tazartes et al. ...... | 701/4 |
| 6,462,703 B2 | * 10/2002 | Hedrick ............. | 342/120 |

* cited by examiner

Primary Examiner—Edward Lefkowitz
Assistant Examiner—Jermaine Jenkins
(74) Attorney, Agent, or Firm—Cohen, Pontani, Lieberman & Pavane

(57) ABSTRACT

In an aircraft conventionally-including a redundant pair of independent primary altitude determination systems of accuracy certified for RVSM operations, an initially loosely calibrated backup altimeter receives independent static pressure data for use in calculating altitude. During normal flight of the aircraft, the current altitude determinations of the primary altimeters and, using a recursive filter, the static source error correction (SSEC) of the backup altimeter is recursively adjusted until the SSEC attains a steady-state value with which the calculated altitude determinations by the backup altimeter accurately conform to the altitude determinations of the primary altimeters. Through this self-correction functionality the backup altimeter is rendered sufficiently accurate for permitted use in RVSM airspace in the event of a failure of one of the primary altitude determination systems.

16 Claims, 2 Drawing Sheets

REDUNDANT ALTIMETER SYSTEM WITH SELF-GENERATING DYNAMIC CORRECTION CURVE

BACKGROUND OF THE INVENTION

1. Field of the Invention

This invention relates generally to methods and systems for providing reliable altitude measurements for aircraft. More particularly, the invention relates to redundant altimeter systems for aircraft.

2. Description of Related Art

As air travel has become increasingly commonplace, increasing numbers of aircraft fill the sky, leading to growing concerns about safety and efficiency in the use of available airspace. Aviation authorities, such as the United States Federal Aviation Authority (FAA), have been entrusted with establishing rules for the use of the airspace, and for ensuring that the available airspace is used safely, efficiently and effectively.

Since aircraft are not bound to preset physical routes, such as roads or railways, in the guidance of aircraft along predefined air routes, one of the most important sets of safety rules promulgated by aviation authorities relates to the separation of aircraft. Such traffic separation rules ensure that aircraft which are flying in the same airspace are of the same type and are travelling generally in the same direction. This is intended to avoid, for example, a jumbo jet flying west having to dodge private planes or jets travelling east at the same flight level.

To manage the air corridors efficiently, the FAA has since the 1950's mandated a Vertical Separation Minimum of 2000 feet at flight levels above 29,000 feet (Flight Level 290). While this has worked well for many years, the available airspace above FL 290 has grown more crowded as increasing numbers of aircraft seek to use the finite airspace that exists between flight level 290 and flight level 600.

To accommodate this growth, beginning in 1997 and continuing through 2002 the FAA is phasing in Reduced Vertical Separation Minimum (RVSM) regulations, which mandate a 1000 foot minimum required vertical separation in certain prime airspace (above FL 290 and ultimately extending to FL 410). This will effectively double the amount of air traffic concurrently permitted in that air space, relieving some of the congestion inherent in the prior system.

With a reduction in vertical separation minima, however, precision in measuring altitude becomes even more crucial to the safety of aircraft. Measurement errors which could heretofore be disregarded when an aircraft's actual altitude could safely vary by several hundred feet from its measured altitude are unacceptable when the minimum vertical separation is reduced to 1000 feet.

To accommodate the need for greater precision in altitude measurement, new FAA rules (including Interim Guidance Material on the Approval of Operators/Aircraft for RVSM Operations, 91-RVSM, as amended Jun. 30, 1999; and Master Minimum Equipment List Global Change 59, PL-84, Aug. 15, 1997) mandate the use of at least two highly accurate, and independent, altitude measurement systems to ensure that each aircraft operate and remain in the appropriate altitude range for its type and direction of travel. These new rules require that if during the flight one of the altitude measurement systems is deemed inaccurate, the aircraft must leave RVSM airspace and thereafter fly only in non-RVSM airspace.

The RVSM range of altitudes, however, is the prime range in commercially traveled airspace because it includes the most fuel-efficient altitudes. It is therefore highly desirable for aircraft to use RVSM airspace whenever possible. Being required to leave the RVSM airspace can accordingly have dramatic effects on the aircraft's operating efficiency, mandating the use of more fuel which decreases the attainable range and makes the flight more costly to the operator. On long flights, such as across the Pacific, flying in non-RVSM airspace may increase fuel usage by an amount sufficient to force the aircraft to make an unscheduled landing to re-fuel, thereby delaying the flight. For scheduled commercial flights, this can be disastrous in terms of cost and increased passenger dissatisfaction.

As stated, under the new FAA rules, to fly in RVSM airspace an aircraft must maintain at least two working error-corrected altimeters to provide accurate cross-checked altitude data to the cockpit crew. Altimeters are "error-corrected" when they are calibrated to take into account the dynamic and static pressure variations which occur during altitude measurements.

The FAA permits the certification of groups (i.e. of at least eight) of identically manufactured aircraft with respect to their altitude measurement. To obtain a group certification, the manufacturer must engage in extensive computational fluid dynamics (CFD) calculations, as well as in-flight testing of the group exemplars, including use of a trailing cone for measuring pressure altitude.

The computational portion of the correction may be performed on the ground, based upon the physical configuration of the aircraft and the manufacturing tolerances for imperfections in the external "skin" of the aircraft, i.e. the "waviness" of the skin.

In-flight measurement of altitude is based primarily upon monitoring of the static air pressure on the exterior of the aircraft. All other measurements are used to adjust the basic calculation of altitude based upon the static air pressure. There are many sources for error in the calculation of altitude based upon static air pressure, such as possible leaks in the conduits used to covey the air for measurement, mechanical errors in the system, etc. These errors are collectively referred to as static source errors, and altimeters are routinely calibrated to account for these errors with a correction factor known as the Static Source Error Correction (SSEC). Once an aircraft is manufactured, most aspects of the SSEC may be calculated with only minimal in-flight testing. With these tests performed, and a group of aircraft certified, the SSEC for the entire group may be determined within RVSM requirements. The SSEC for an aircraft is maintained in the air data computers (ADCs) of the aircraft.

The SSEC for an aircraft varies however with the operating speed of the aircraft due to variations in the fluid air flow over the aircraft skin, and is therefore usually depicted as a series of curves for differing air speeds which are expressed as a function of "mach" (i.e. the speed of sound). Skin waviness near the static pressure port of as little as one one-thousandth of an inch may cause a variation in the static pressure measurement sufficient to alter the altitude calculation by as much as 50 feet. Given the closeness of permissible vertical separation of aircraft in RVSM airspace even these minute variations must be closely monitored, which is why RVSM maintenance regulations call for costly and extensive maintenance procedures for the aircraft skin in the vicinity of static pressure ports.

In producing aircraft for use in RVSM air space, therefore, special care must be paid to ensuring the initial and continued accuracy of the altimeters and of the altitude readings produced thereby. It is for that reason that the FAA regulations require the availability and use of two independent altitude measurement systems at all times if an aircraft is to fly in RVSM airspace. Should one of the two error-corrected altimeters fail, the aircraft is prohibited from entering RVSM airspace and, if it fails while the aircraft is operating in RVSM airspace, the aircraft must leave that airspace, immediately.

Although some newly-manufactured aircraft have been built with a third, backup altimeter, that third altimeter is not typically certified to RVSM standards and therefore cannot be used to permit an aircraft to operate in RVSM airspace if one of the two primary altimeters fails. The costs of a third independent, RVSM-certified altimeter are simply too high to justify their inclusion as a backup unit, in that both the costs of the additional hardware itself and the need to add and maintain additional static pressure ports on the aircraft skin are so substantial.

There is accordingly a need in the art for a method and system for deploying a cost-effective backup altimeter for permitted use in RVSM airspace in the event of a failure of one of the two primary altitude measurement systems.

SUMMARY OF THE INVENTION

An RVSM-compliant altitude measuring system in accordance with the present invention includes two highly accurate primary altimeters coupled to RVSM-compliant primary static air pressure ports on the skin of an aircraft. The inventive system also includes a third, backup altimeter which is coupled to a different or separate static port. The third altimeter dynamically self-calibrates, using one or both of the primary RVSM-certified altimeters, by means of a recursive error-correcting filter (preferably a Kalman filter) continuously whenever the aircraft is in flight so that through such actual usage over time, the backup altimeter is thereby calibrated to an accuracy within RVSM mandated tolerances. Should one of the two primary altimeters fail, the backup altimeter may then replace the failed unit and thereby allow the aircraft to remain in RVSM airspace.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

Figure 1:
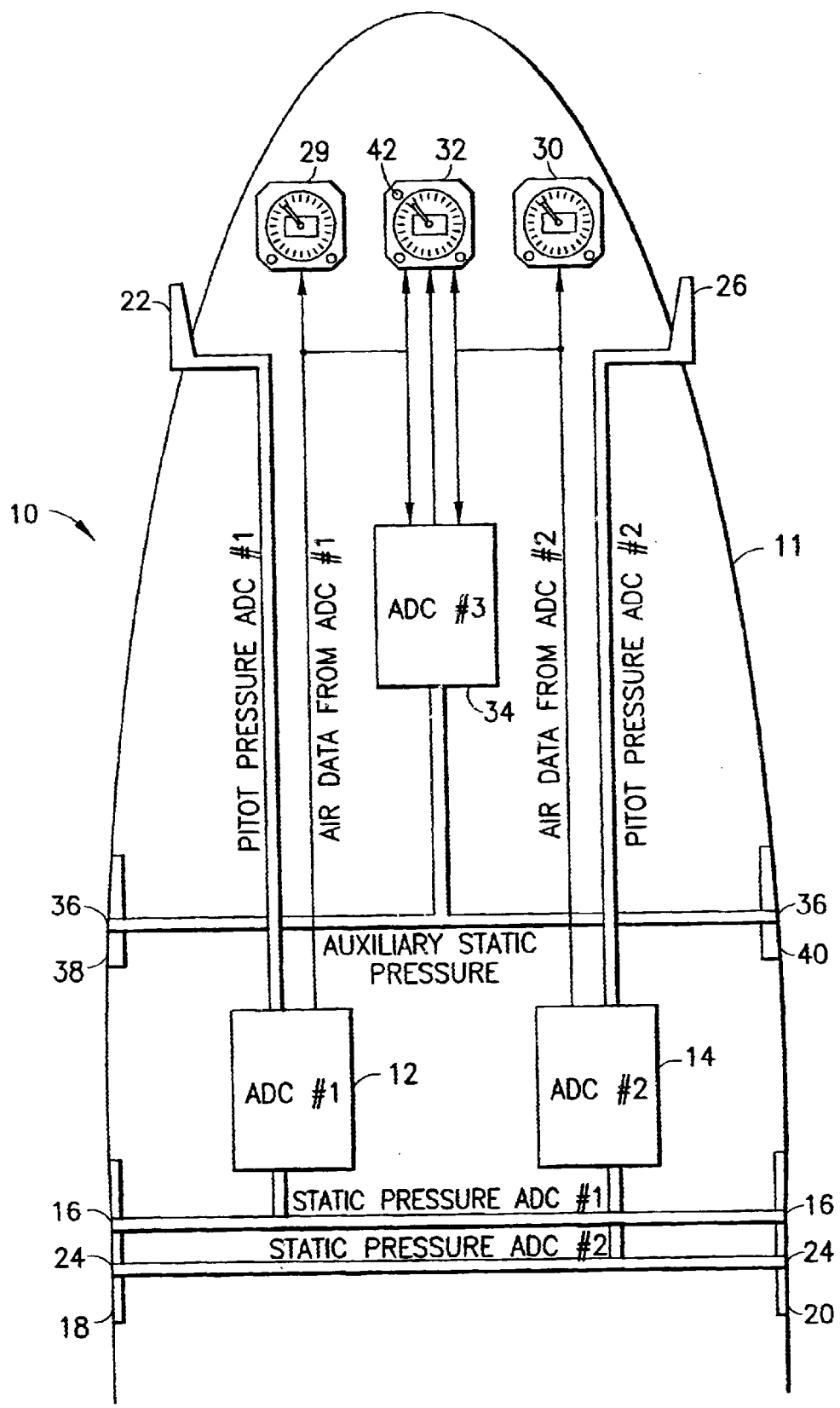
FIG. 1 is a block diagram of a self-correcting backup altimeter system in accordance with the present invention installed in an aircraft meeting RVSM altitude-measurement requirements.

FIG. 1 depicts the relevant systems of an aircraft 10 having a redundant pair of primary altimeter systems to meet the mandated requirements of RVSM operation. Thus, aircraft 10 includes a first air data computer (ADC) 12 and a second ADC 14 to comply with RVSM regulations. First and second ADCs 12, 14 independently gather and compute information utilized by the aircraft and crew during flight and, as is most preferred, may utilize or operate on different operating systems, hardware and other components to ensure their independence and avoid any possibility of dual system failures resulting from common implementation.

First ADC 12 receives information or data relating to the static pressure on the exterior of aircraft 10 from first static pressure ports 16 located in areas 18, 20 of aircraft skin 11. Aircraft skin 11 is manufactured in areas 18, 20 to strict tolerances and is maintained to exacting specifications as required by RVSM regulations. First ADC 12 also receives pitot pressure information from a first pitot pressure port 22 that is located on or adjacent skin 11 at a position removed from areas 18, 20.

Second ADC 14 similarly receives static pressure information from second static pressure ports 24, that are likewise located in areas 18, 20, of the skin 11, and also receives pitot pressure information from a second pitot pressure port 26 remote from areas 18,20 and port 22.

In operation, first ADC 12 processes the information received from all relevant sources, indicating static pressure ports 16, and generates a signal indicative of the calculated corrected altitude to a first (pilot) altimeter 28 in known fashion. Similarly, second ADC 14 receives static pressure information from second static pressure ports 24 and generates a signal indicative of the independently calculated and corrected altitude of aircraft 10 to a second (co-pilot) altimeter 30. The flight crew is thus able to compare altimeters 28, 30 which should closely agree to ensure that aircraft 10 is operating within the mandated parameters for RVSM operation. This is all conventional.

In accordance with the invention, aircraft 10 is also provided with a third, backup altimeter 32 that receives and displays calculated altitude indication data that is output by a third ADC 34. Although the unit 34 is denoted herein and depicted in FIG. 1 as an air data computer, and may in fact operationally duplicate all of the capabilities and functionality of the primary ADCs 12, 14, significantly less functionality is required of the unit 34 by the improvement of the present invention. Accordingly, ADC 34 may instead be implemented by any controller suitably constructed, configured and interconnected to the other components and devices of the aircraft 10 for performing the operations and functions described herein and otherwise for providing a self-calibrating backup altitude indication on backup altimeter 32. Moreover, while it is generally intended and contemplated that ADC or controller 34 will be microprocessor based, any other implementation based on custom ASICs (Application Specific Integrated Circuits) or other combinations of conventional integrated circuits and/or discrete electronic components and the like may alternatively be employed in unit 34. For convenience and ease of description, and with the foregoing in mind, the unit 34 is nevertheless referred to herein as an ADC.

Auxiliary ADC 34 is in any event independent of the primary ADCs 12, 14 and receives ambient (i.e. exterior to the aircraft skin) static pressure information from one or more independent auxiliary static pressure ports 36 which are located on aircraft skin 11 at locations 38, 40 remote from areas 18, 20. Advantageously, skin 11 at locations 38, 40 is not manufactured or configured or contoured, and need not be maintained, to the exacting geometries and tolerances required for RVSM operation in the manner of areas 18, 20. Thus, the exact geometry of the aircraft skin at areas 38, 40, and/or the characteristics of ports 36, are not initially known (nor necessarily consistent from sample to sample of a particular aircraft model) with RVSM-required precision. As a result, the SSEC values for auxiliary static ports 36 are not known or readily determinable, absent costly and extensive testing and in-flight calibration procedures (that are unnecessary in accordance with the present invention) for each as-built aircraft 10. Instead, when the aircraft is manufactured, or upon initial installation of the backup altimeter system of the invention, or after maintenance activities relating to or otherwise affecting auxiliary static ports 36 or the airframe skin in the vicinity of auxiliary static port areas 38, 40, an "approximate" or "estimated" initial SSEC—based, by way of example, on values developed during flight testing of a prototype of aircraft 10—is utilized by ADC 34 to calculate the altitude for display on backup altimeter 32. At initial delivery of the aircraft or after certain aircraft maintenance operations, therefore, the backup altimeter 32 cannot be immediately used for RVSM operations until it has thereafter undergone self-calibration to RVSM accuracy in accordance with the invention during a sufficient period of normal flight of the aircraft.

The self-calibration of the inventive backup altimeter system is carried out continuously whenever the aircraft is in flight. In short, auxiliary ADC 34 dynamically compares the current altitude determinations output by primary ADCs 12, 14 for display on the primary altimeters 28, 30 with the altitude determination made by auxiliary ADC 34 using, at the outset, its initial SSEC and, as time progresses, a modified or corrected SSEC. Auxiliary ADC 34 utilizes a learning algorithm or process for dynamically correcting the SSEC so that, over time, the altitude determinations output by auxiliary ADC 34 become as accurate as those output by the primary ADCs 12, 14.

Figure 2:
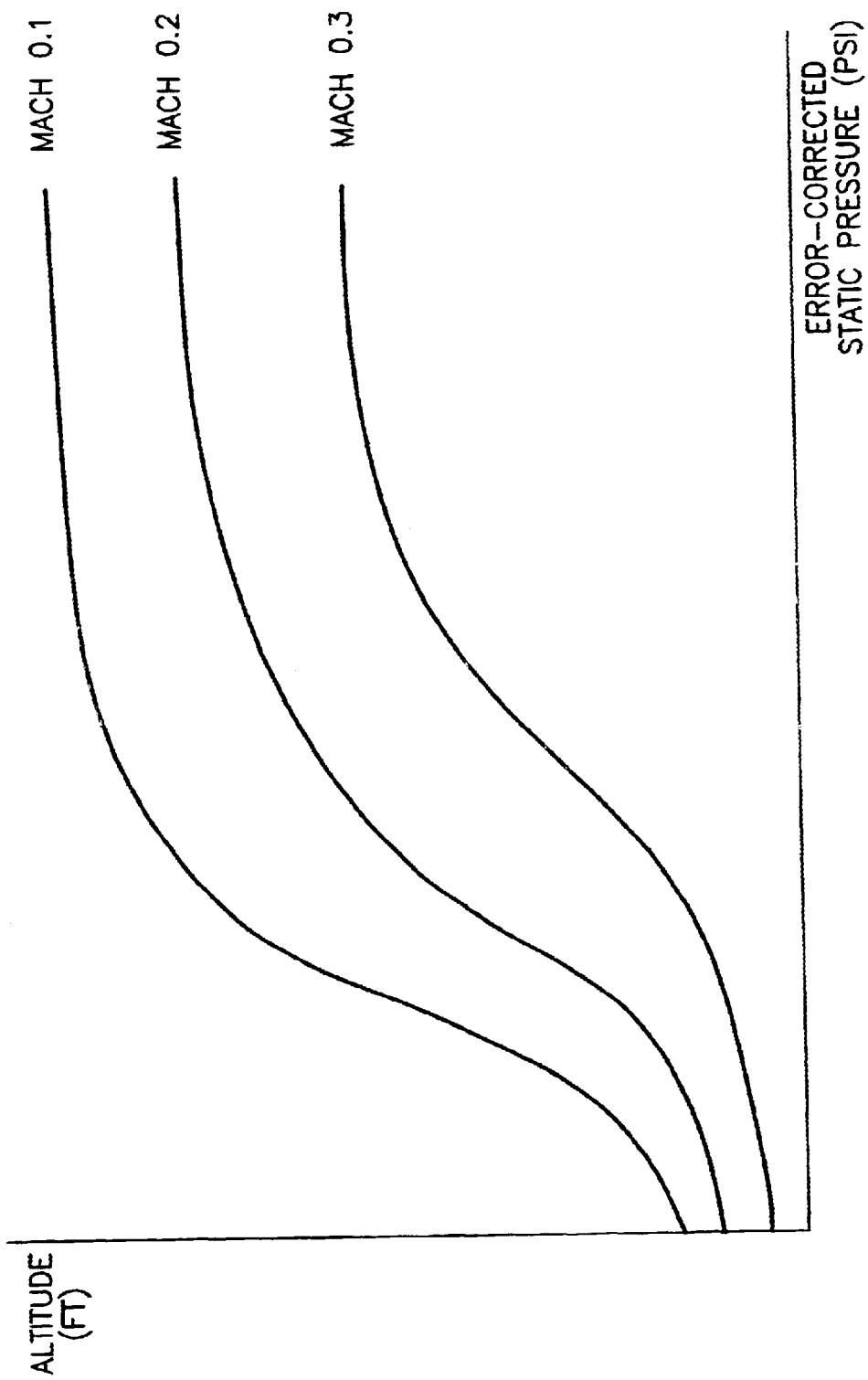
FIG. 2 graphically depicts by way of example a set of dynamically-developed, error-corrected altitude measurement SSEC curves.

Auxiliary ADC 34 thus receives pressure information or data from auxiliary static ports 36 for use in calculating current altitude, using an SSEC stored for that ADC 34 and which is independent of the SSECs of primary ADCs 12, 14. As previously noted, at the time of installation or first use the stored SSEC for auxiliary ADC 34 has an "approximate" or "estimated" initial value that is not intended or expected to yield an altitude determination calibrated or accurate to a degree sufficient to support RVSM operations. Auxiliary ADC 34 also receives as inputs certain signals from primary ADCs 12, 14 which relate to the altitude determinations calculated by ADCs 12, 14. The calculated altitudes output by primary ADCs 12, 14 have of course been carefully and reliably calibrated to an accuracy sufficient for certified RVSM operations and, so long as the altitude outputs of the primary ADCs 12, 14 remain in agreement, auxiliary ADC 34 can reasonably operate under the assumption that those determinations are sufficiently error free to support RVSM operation of the aircraft. Auxiliary ADC 34 accordingly continuously compares its current calculated altitude determination with the current altitude determinations of primary ADCs 12, 14 and applies a suitable correction to its stored SSEC toward achieving a corresponding altitude determination based on its own independently carried out calculations. Since SSEC values vary with airspeed (e.g. Mach number), auxiliary ADC 34 additionally receives—for example from primary ADCs 12, 14—current airspeed data for use in developing calibrated SSEC curves such as those depicted in FIG. 2, and may also receive additional data relating to aircraft performance and/or flight parameters as will be apparent to those skilled in the relevant art.

It should be noted that although the dynamic comparison of the current altitude as calculated by auxiliary ADC 34 with the calculated altitude determinations of the primary ADCs 12, 14, and the ensuing corrections of the SSEC of the auxiliary ADC 34, is described herein as being continuously performed, the comparison and correction may in practice be carried out repeatedly at predetermined intervals deemed suitable to result in reasonably rapid determination of accurate SSEC curves for the aircraft. The interval between subsequent repetitions of the comparison and SSEC corrections may, in addition, be varied as a function of aircraft flight parameters or otherwise as general matters of design and engineering choice.

The learning algorithm employed by auxiliary ADC 34 for continuously (or repeatedly) correcting and updating and refining the SSEC values and curves is preferably a recursive algorithm that gradually "seeks", as a function of time, high precision SSEC values that can be relied upon for aircraft operations in RVSM airspace. Most preferably, the learning algorithm is implemented by a conventional Kalman filter, which is a well-known statistical construct that is useful in predicting, over time, the states of a system based upon measurements of a variable and a comparison of initial predictions with the actual value of a given state. In this instance, the Kalman filter provides a methodology for determining, with increasing accuracy with the progression of time, the actual altitude of an aircraft 10 based upon pressure data from auxiliary static ports 36 and comparison of the auxiliary ADC's altitude determination with the calibrated altitude determinations output to the primary altimeters 28, 30.

In this manner the self-calibration of backup altimeter 32, to an accuracy sufficient to support RVSM operations, can be effected relatively quickly during a single flight of the aircraft so that, in the event that one of the primary altimeters 28, 30 fails in the course of that flight, backup altimeter 32 can take over for the failed primary altimeter to thereby permit the aircraft to remain in RVSM airspace. Of course the longer that the aircraft flies, and the more flights at varying altitudes and airspeeds that it takes, the more refined and accurate will be the SSEC curves that are generated for the auxiliary ADC 34 and backup altimeter 32—although, as will be appreciated, the calculated SSEM curves will relatively quickly attain steady state values that are unlikely to appreciably change absent changes to the contours or physical characteristics or geometries of the auxiliary static ports 36 or the aircraft skin 11 in the areas 38, 40, whether as a result of intentional modifications or maintenance by ground or aircraft personnel or due to an in-flight incident that unexpectedly changes the characteristics of the ports or skin areas or the like. Indeed, any such change—whether on the ground or during flight—will be immediately apparent as the continuously operating learning algorithm of the auxiliary ADC 34 dynamically identifies differences between the altitude determinations output by the primary ADCs 12, 14 (or, where one of the primary ADCs has failed, by the remaining "good" primary ADC) and the independent altitude determination by auxiliary ADC 34.

Auxiliary altimeter 32 can be provided with an associated lamp 42 or other indicator, on or adjacent its faceplate, that is illuminatable or otherwise operable to indicate to the flight crew that the SSEM curves of auxiliary ADC 34 have stabilized (i.e. that their values have reached a state of equilibrium) so that, based additionally on the comparatively-confirmed accuracy of the altitude indications on backup altimeter 32, the backup altimeter has been suitably and sufficiently calibrated to support its use in RVSM operations. Any subsequent change in a characteristic of the auxiliary ports 36 or of the aircraft skin in the areas 38, 40—which will immediately result in detected differences as between the altitude determinations of the auxiliary ADC 34 and the primary ADC(s) 12, 14—will cause the indicator 42 to be extinguished and/or activation of another indication or alarm to so alert the flight crew of continued, ongoing adjustments of the auxiliary ADC SSEM.

Thus, the static air pressure measurements or data from auxiliary static pressure ports 36 are relayed to auxiliary ADC 34 which uses that data to estimate the altitude to be shown on auxiliary altimeter 32. Auxiliary ADC 34 is initially provided with an estimated SSEC or SSEC curves for use in its initial, uncalibrated determinations of altitude using the data from auxiliary ports 36. When the aircraft is in flight, auxiliary ADC continually compares its current calculated estimate of altitude with the calibrated altitude determinations from primary ADCs 12, 14 and, using a Kalman filter algorithm (or other learning or suitable compensation algorithm), recursively or otherwise continuously adjusts and modifies the SSEC values that it is using to calculate and correct the resulting altitude estimate. This process continues, even after the SSEM values have stabilized and the altitude determinations by auxiliary ADC 34 agree precisely with those from primary ADCs 12, 14, thereby providing dynamic steady-state monitoring of and, if needed, corrections to the SSEC. The backup altimeter 32, as driven by auxiliary ADC 34, is therefore continuously self-calibrating during flight for permissible use in RVSM airspace should one of the primary altimeters 28, 30 fail.

The present invention accordingly provides significant cost savings, both in initial hardware and installation costs and in subsequent maintenance costs, as contrasted with the installation of a third (backup) pre-calibrated altimeter system such as those of primary altimeters 28, 30. The auxiliary static ports 36, and the aircraft skin 11 in the area of the ports 36, need not be contoured or otherwise configured to precisely known geometries and so maintained during the operating life of the aircraft. The backup altimeter unit 32 itself, since it is intended for emergency rather than regular or long-term use to support flight in RVSM airspace, need not necessarily be of same level of precision, and therefore as costly to the aircraft manufacturer, as the primary altimeters 38, 30. In addition, no time-consuming and expensive pre-certification procedures for RVSM operations need be carried out for the backup altimeter system of the invention. Finally, during every flight of the aircraft the inventive backup altimeter system continuously and dynamically operates in a self-calibrating mode that assures that, should it be needed to support continued RVSM operations in, for example, the event of a failure of one of the primary altimeter systems, the backup altimeter will be precisely calibrated and ready to assume that functionality and task.

As will also be apparent, the hardware and operating functions of auxiliary ADC or controller 34 may optionally be incorporated directly in the housing of backup altimeter 32 to provide a compact and self-contained device that may be readily installed and incorporated in newly-manufactured aircraft or added to existing aircraft.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

I claim:

1. An aircraft altitude measuring system, comprising:
   means for determining an actual error-corrected altitude of the aircraft during flight to a first predetermined level of accuracy;
   means for calculating an estimated altitude of the aircraft during flight as a function of at least one variable;
   means for obtaining data representing said at least one variable during flight of the aircraft and for delivering said data to said calculating means;
   means for recursively comparing said calculated estimated altitude with said determined actual altitude of the aircraft and for dynamically generating from said comparison a static source error correction of said function during flight so that said function achieves in calculating the estimated altitude at least a second predetermined level of accuracy; and
   means for storing said static source error correction for use in subsequent calculation of estimated altitude.

2. The system of claim 1, wherein said means for determining an actual altitude of said aircraft during flight comprises two independent error-corrected altimeters.

3. The system of claim 1, wherein said means for comparing operatively compares said determined actual altitude and said calculated estimated altitude substantially continuously during the flight of the aircraft.

4. The system of claim 1, wherein said at least one variable is static air pressure on an exterior skin of the aircraft during flight.

5. The system of claim 1, wherein said means for comparing and generating comprises a Kalman filter.

6. A method of providing redundant altitude measurements for an aircraft during flight, comprising the steps of:
   determining an actual error-corrected altitude of the aircraft during flight to a first predetermined level of accuracy;
   calculating an estimated altitude of the aircraft during flight as a function of at least one variable;
   obtaining data representing said at least one variable during flight of the aircraft;
   recursively comparing said calculated estimated altitude with said determined actual altitude of the aircraft, and dynamically generating from said comparison a static source error correction of said function during flight so that said function achieves in calculating the estimated altitude at least a second predetermined level of accuracy; and
   storing said generated static source error correction for use in subsequent calculations of estimated altitude.

7. The method of claim 6, wherein said determining of the actual altitude of the aircraft during flight is performed using two independent error-corrected altimeters.

8. The method of claim 6, wherein said step of comparing is performed substantially continuously during flight of the aircraft.

9. The method of claim 6, wherein said at least one variable is static air pressure on an exterior skin of the aircraft during flight.

10. The method of claim 6, wherein said step of comparing and generating is performed using a Kalman filter.

11. In an aircraft having a first primary altitude indicator system operable for determining current altitude of the aircraft to a precision sufficient for Reduced Vertical Separation Minimum (RVSM) flight operations of the aircraft and a second primary altitude indicator system operable for determining, independent of said first primary system, the current altitude of the aircraft to a precision sufficient for RVSM flight operations, each of said first and second primary systems being connected to primary static pressure ports defined on a skin of the aircraft, the improvement comprising a self-calibrating backup altimeter system comprising:

a controller for receiving static pressure data from an auxiliary static pressure port independent of said primary ports and having a stored Static Source Error Correction (SSEC) for use in calculating, using the received static pressure data from the auxiliary port, an estimated current altitude of the aircraft, and said controller being connected for receiving from the first and second primary systems the current altitude determined by said first and second primary systems and being operable for comparing the estimated current altitude with the received current altitude determined by said first and second primary systems, for correcting the SSEC in accordance with said comparison so that the estimated current altitude accords with the received current altitude determined by said first and second primary systems, and for storing the corrected SSEC for use in calculating a new estimated current altitude for comparison with newly-received current altitude determinations from said first and second primary systems.

12. In an aircraft in accordance with claim 11, said controller being operable for correcting the SSEC in accordance with said comparison, so that the estimated current altitude accords with the received current altitude determined by said first and second primary systems, by using a recursive algorithm that progressively minimizes differences between the estimated current altitude and the current altitude determined by said first and second primary systems.

13. In an aircraft in accordance with claim 12, said recursive algorithm comprising a Kalman filter.

14. In an aircraft in accordance with claim 11, said controller being connected to at least one of said first and second primary systems for receiving from said at least one primary system a calculated flight speed of the aircraft for use in correcting the SSEC.

15. In an aircraft in accordance with claim 11, said backup altimeter system further comprising an indicator actuatable by said controller when the corrected SSEC has attained through said correcting of the SSEC a steady-state value that provides sufficient accuracy in the estimated current altitude for use of the backup altimeter system for RVSM flight operations.

16. In an aircraft in accordance with claim 13, said backup altimeter system further comprising an indicator actuatable by said controller when the corrected SSEC has attained through said correcting of the SSEC a steady-state value that provides sufficient accuracy in the estimated current altitude for use of the backup altimeter system for RVSM flight operations.

* * * * *